Feb. 13, 1973    W. F. MIETLA    3,715,994
LOW CLEARANCE VEHICLE TIEDOWN WINDLASS MECHANISM
Filed July 13, 1970    4 Sheets-Sheet 1

INVENTOR.
WALTER F. MIETLA
BY
Barnes, Kisselle, Raisch & Choate
ATTORNEYS

Feb. 13, 1973   W. F. MIETLA   3,715,994
LOW CLEARANCE VEHICLE TIEDOWN WINDLASS MECHANISM
Filed July 13, 1970   4 Sheets-Sheet 3

INVENTOR.
WALTER F. MIETLA
BY
Barnes, Kisselle, Raisch & Choate
ATTORNEYS

Feb. 13, 1973 W. F. MIETLA 3,715,994
LOW CLEARANCE VEHICLE TIEDOWN WINDLASS MECHANISM
Filed July 13, 1970 4 Sheets-Sheet 4

INVENTOR.
WALTER F. MIETLA
BY
Barnes, Kisselle, Raisch & Choate
ATTORNEYS

United States Patent Office 3,715,994
Patented Feb. 13, 1973

3,715,994
LOW CLEARANCE VEHICLE TIEDOWN WINDLASS MECHANISM
Walter F. Mietla, Dearborn, Mich., assignor to Portec, Inc., Chicago, Ill.
Filed July 13, 1970, Ser. No. 54,184
Int. Cl. B60p 7/08; B61d 45/00
U.S. Cl. 105—368 T                  17 Claims

ABSTRACT OF THE DISCLOSURE

A low silhouette vehicle tiedown windlass device having a frame plate which slidably grips the cross flange of a T-beam of a cargo carrier for movement only along the beam. A locking dog is mounted for limited pivotal movement adjacent the plate and is spring biased against the plate to insert a locking pin of the dog into registering holes in the plate and T-beam to lock the tiedown against movement along the T-beam. The device has a low silhouette pawl and ratchet windlass mechanism including a drum rotatably captured in the frame and connected to one end of a tiedown chain, the drum being rotatable about an axis perpendicular to the plate for taking up and paying out the tiedown chain.

---

This invention relates generally to an apparatus for securing cargo to a carrier conveyance, and more particularly to hold-down or tiedown apparatus for securing automotive vehicles during shipment on railway cars or highway haulaways.

A large percentage of the automotive vehicles manufactured today are shipped from the point of final assembly to dealers on specially designed multi-level railway or highway carriers, the vehicles usually being end loaded on the carrier by being driven on under their own power and then arranged on each level thereof in tandem relation. In either type of conveyance, it is necessary to provide vehicle tiedown means capable of reliably securing numerous makes and models of vehicles which vary in length, road clearance and weight. One such vehicle tiedown device which has proven very successful is disclosed in U.S. Pat. No. 3,187,686, assigned to the assignee herein.

An object of the present invention is to provide an improved tiedown windlass mechanism adapted to mount on a T-beam rail of the type disclosed in the aforementioned U.S. Pat. No. 3,187,686, but which offers a lower silhouette to accommodate vehicles with very low road clearances in accordance with the prevailing trends in United States passenger vehicle design.

A further object is to provide a tiedown device of the above character having a windlass mechanism of the pawl and ratchet drum type mounted with the axis of rotation of the drum perpendicular to the upper surface of the T-beam and arranged to provide a very compact mechanism providing a minimum vertical projection above the T-beam.

Other objects, features and advantages of the present invention will become apparent from the following detailed description taken in conjunction with the accompanying drawings wherein.

Referring in more detail to the accompanying drawings, FIGS. 1–10 inclusive illustrate a preferred but exemplary form of a low clearance windlass tiedown 32 in accordance with the present invention which is particularly adapted for use on a T-beam type anchoring rail 20 as disclosed in U.S. Pat. No. 3,187,686.

Figure 1:
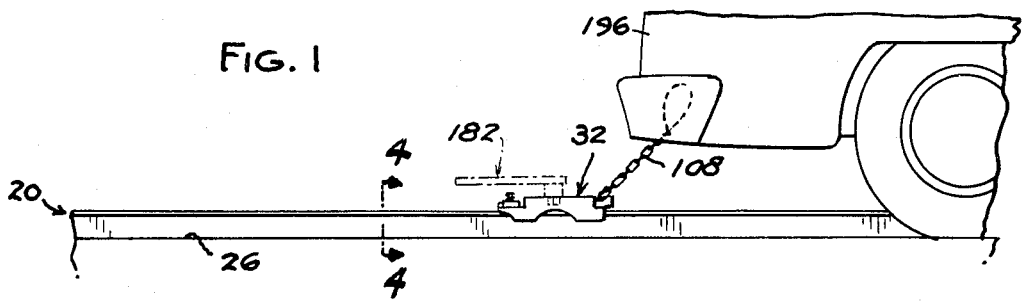
FIG. 1 is a fragmentary side elevational view of a deck of a railroad automobile loader car provided with T-beam guide tracks and a low clearance tiedown windlass mechanism of the present invention securing the automobile to the deck of the railroad car.
Figure 4:
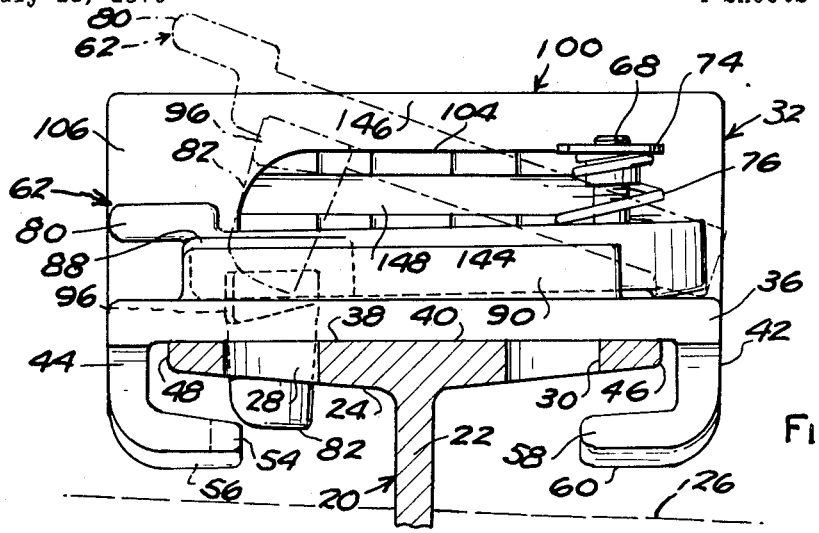
FIG. 4 is an end elevational view of the locking dog end of the tiedown mechanism of FIG. 1, being taken in vertical section on the line 4—4 of FIG. 1.
Figure 5:
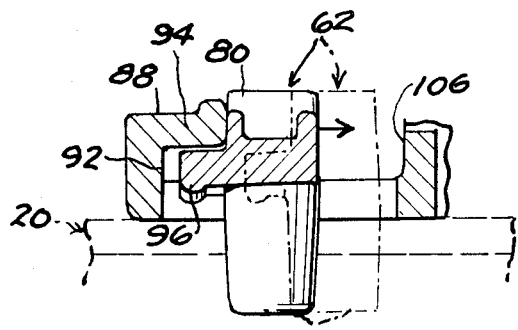
FIG. 5 is a fragmentary vertical section taken on the line 5—5 of FIG. 2 and illustrating in phantom a shifted position of the locking dog.
Figure 6:
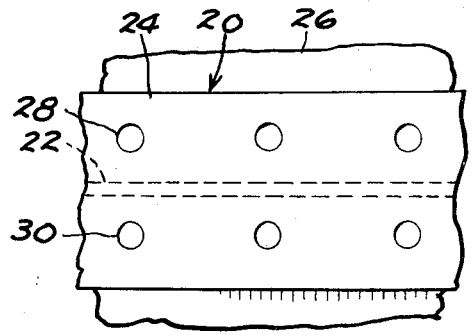
FIG. 6 is a top plan view of the T-beam or anchoring rail of FIG. 1.

As best seen in FIGS. 1, 4 and 6, T-beam 20 has a vertical web 22 secured to the horizontal deck 26 railway vehicle loading car and projecting upwardly therefrom, and a cross flange 24 joined to the upper end of web 22 and extending horizontally above deck 26 (FIG. 4). Flange 24 preferably is provided with two longitudinally extending rows of holes 28 and 30 which are longitudinally spaced at equal intervals of say three inches to provide selective locking holes for locking the tiedown 32 of the present invention at selected positions along the T-beam 20.

Figure 3:
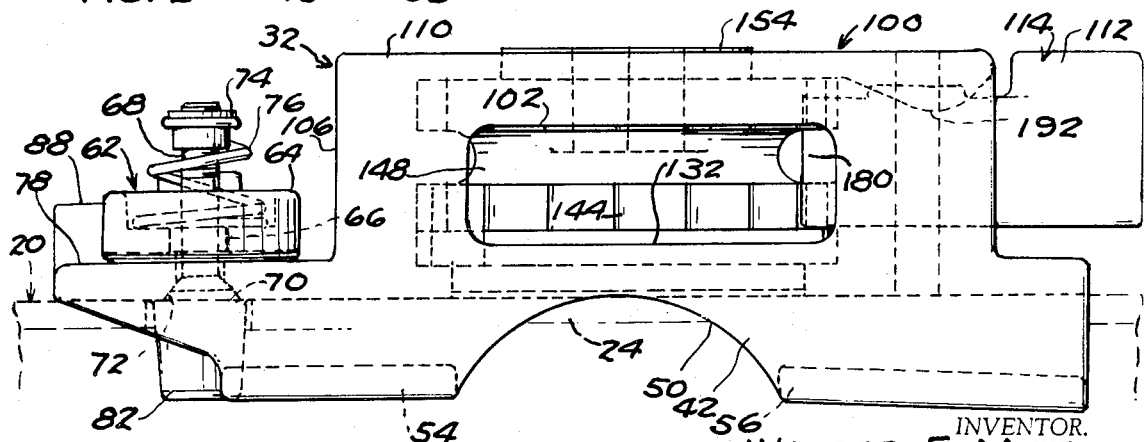
FIG. 3 is a side elevational view of the tiedown windlass mechanism of FIG. 2.
Figure 9:
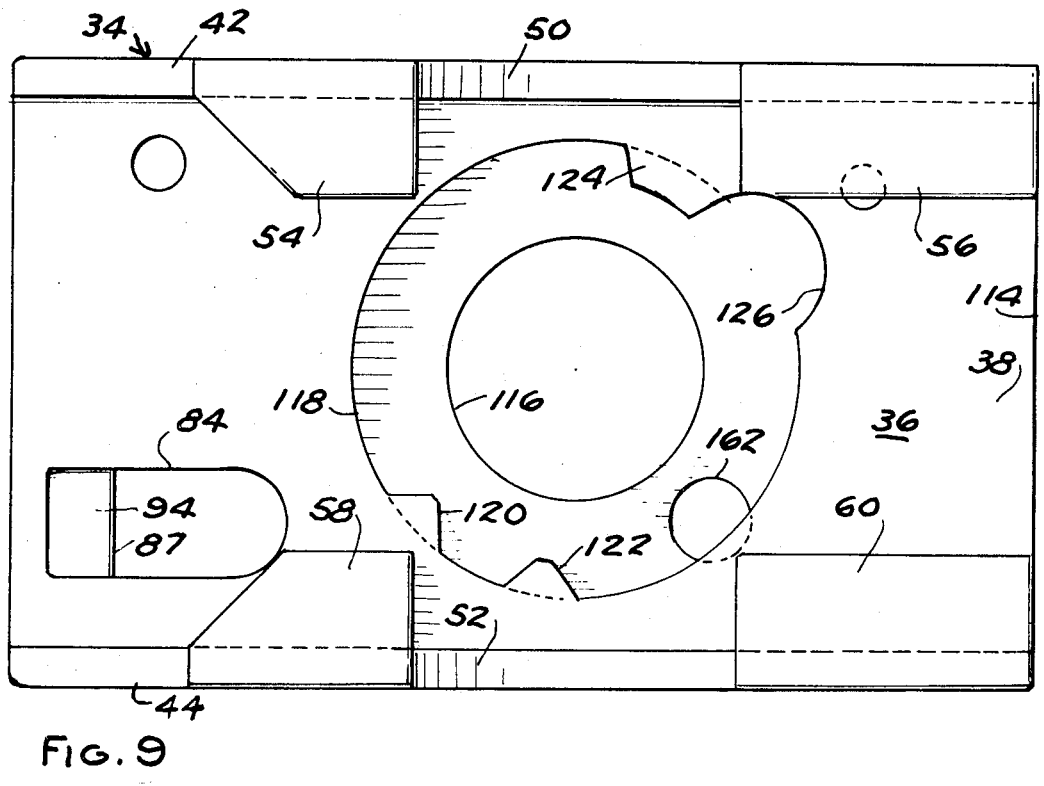
FIG. 9 is a bottom plan view of the cast frame of the tiedown windlass mechanism shown in FIGS. 1–8 inclusive.

Tiedown 32 preferably comprises a frame 34 constructed as a one-piece casting, preferably of cast steel, which slidably engages beam 20 and provides a housing for a pawl and ratchet windlass mechanism as well as a mounting for a locking dog. The one-piece cast frame 34 of tiedown 32 is shown by itself as viewed from beneath in FIG. 9. Frame 34 has a generally flat plate portion 36 having a flat undersurface 38 adapted to seat flat on the flat upper surface 40 of flange 24 (FIG. 4). The right and left edges of plate portion 36, as viewed in FIG. 4, have dependent flanges 42 and 44 respectively which extend downwardly therefrom outwardly of the outer longitudinal edges 46 and 48 of the flange 24 to restrain movement of tiedown 32 laterally of beam 20. Flanges 42 and 44 are notched out at 50 and 52 (FIGS. 3 and 9). The lower edge of flange 42 has a pair of spaced fingers 54 and 56 projecting inwardly therefrom, and likewise flange 44 has a complementary pair of fingers 58 and 60 projecting inwardly therefrom. Fingers 54–60 are spaced below cross flange 24 of T-beam 20 to restrain upward movement of tiedown 32 relative to the beam. The fingers, side flanges and plate portions of tiedown 32 thus slidably embrace cross flange 24 to restrain tiedown 32 from all but sliding movement longitudinally along the T-beam.

The selective locking structure of tiedown 32 consists of a locking dog 62 (FIGS. 2–5) which is mounted on the upper surface of plate 36 for limited universal pivotal movement adjacent the rear end of tiedown 32. Dog 62 thus has a circular rib 64 at its mounted end with a concentric center opening 66 through which a mounting stud 68 passes vertically with a loose clearance. The lower flat head 70 of stud 68 seats in a bevel 72 (FIG. 3) at the lower end of a hole in plate 36 and the upper threaded end of stud 68 receives a flanged cap screw 74 threadably thereon. A spiral coil spring 76 encircles stud 68 and has an upper turn butting beneath the cross flange of nut 74 and a larger bottom end turn seating in the circular pocket defined within the circular rib 64 of dog 62 to thereby yieldably spring bias dog 62 flat against the upper surface 78 of plate 36. The free end of dog 62 has an upwardly offset longitudinally projecting extension 80 to provide a finger hold for lifting dog 82 upwardly against the bias of spring 76 (FIG. 4).

A frusto-conical stud 82 is joined integrally to dog 62 near the free end thereof so as to project downwardly therefrom into an oblong slot 84 in place 36 which extends lengthwise thereof, and thence through a selected hole 28 in beam 20 which has been brought into registry with slot 84 by a longitudinal movement of tiedown 32 along the beam. In locked position, the left edge 86 of dog 62 (FIG. 2) abuts the end face 87 of a keeper housing 88 which is secured integrally to plate 36 adjacent the rear (left edge as viewed in FIG. 2) thereof to serve as an abutment stop for dog 62. Housing 88 is integrally joined to an extension rib 90 which forms a guard for dog 62. Housing 88 has an interior cavity 92 with an overhanging wall 94 adapted to receive a keeper projection 96 which projects laterally from dog 62 into cavity 92 in the abutted locked position of the dog shown in solid lines in FIGS. 2, 3 and 5.

Frame 34 has a housing 100 which generally is square in outline as viewed in plan (FIG. 2) and is joined integrally to the upper surface of plate 36. Housing 100 forms a box-like enclosure having a hollow interior with an opening 102 in each side (FIG. 3) and a similar opening 104 in its rear face (FIG. 4). Housing 100 also has two openings in its front face, a right opening 106 for receiving a flexible tension element such as a link chain 108 therethrough and an opening 110 through which an actuator finger 112 of a pivoted pawl 114 projects. The longitudinal side walls of housing 100 are flush with the side edges of plate 36, but the rear wall 106 of housing 100 is inset from the rear edge 108 of plate 36 to provide swinging room for dog 62. The upper surface 110 of housing 100 is disposed at elevation above the upper end of stud 68 and helps serve to shield the stud and dog 62 from damage. The front wall 112 of housing 100 likewise is inset from the front edge 114 of base 36.

Figure 2:
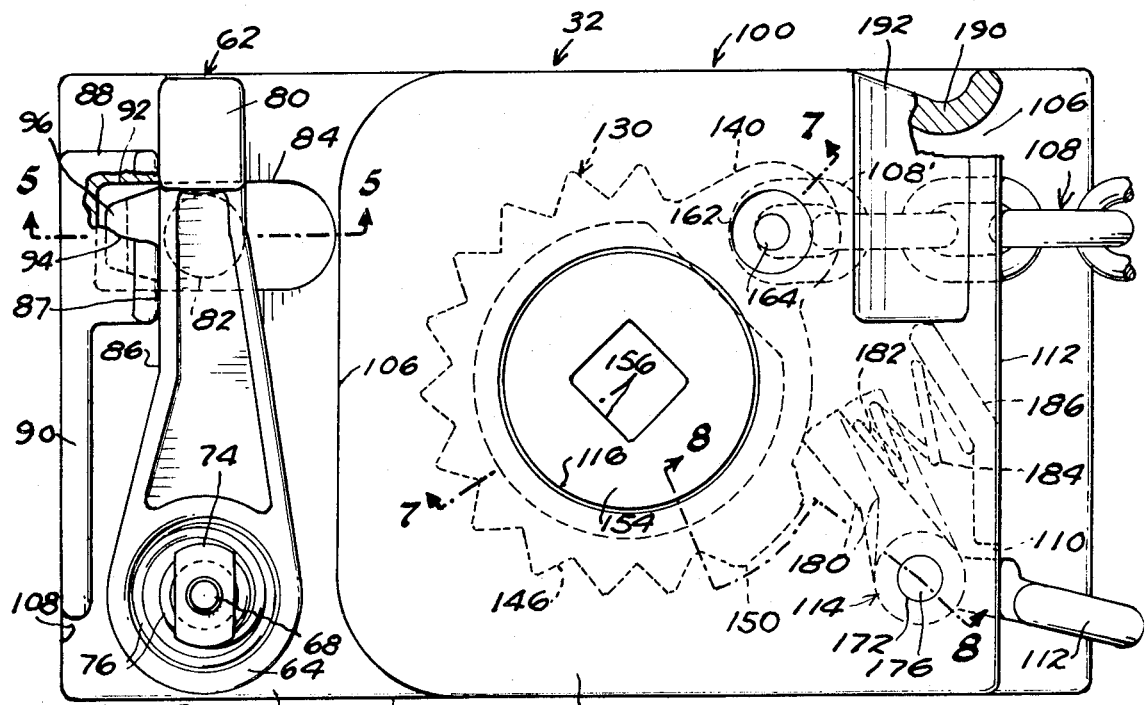
FIG. 2 is a top plan view, on a greatly enlarged scale relative to FIG. 1, of the embodiment of a tiedown windlass mechanism shown in FIG. 1.
Figures 7, 8:
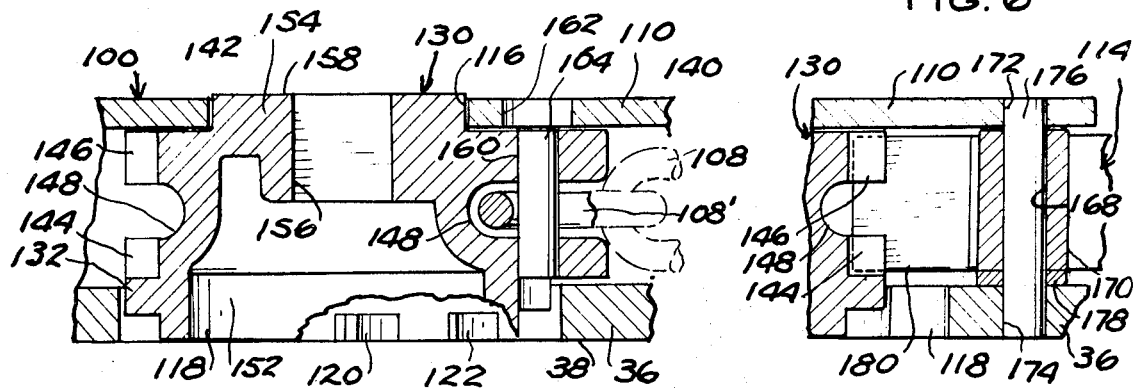
FIG. 7 is a fragmentary vertical section taken on the line 7—7 of FIG. 2.
FIG. 8 is a fragmentary vertical section taken on the line 8—8 of FIG. 2.

As best seen in FIGS. 2 and 7, top wall 110 of housing 100 has a circular opening 116 (see also FIG. 9) which is concentrically aligned with a larger opening 118 in plate 36. Hole 118 has a pair of teeth 120 and 122 projecting radially inwardly flush with the bottom surface 38 of plate 36. A larger tooth 124 located diametrically opposite teeth 120 and 122 also projects radially inwardly from the margin of hole 118. A semi-circular notch 126 in the margin of hole 118 is located adjacent tooth 124 on the side thereof toward the front edge 114 of frame 34.

Figure 10:
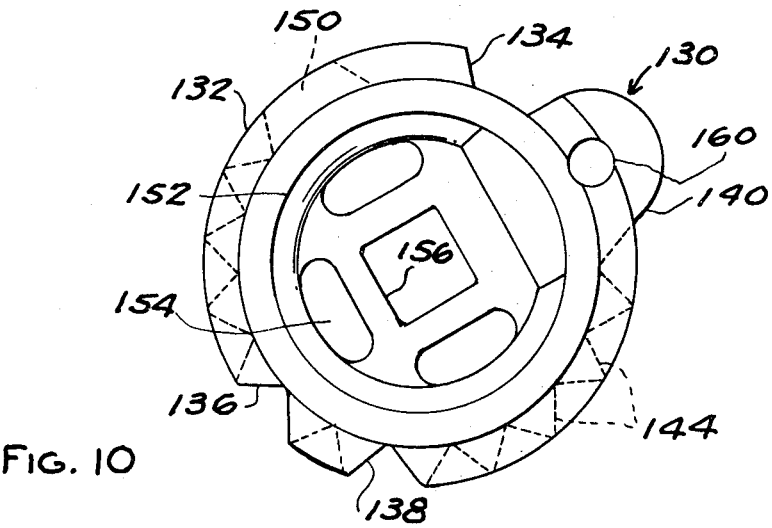
FIG. 10 is a bottom plan view of the windlass drum and ratchet member of the device shown by itself.

The particular configuration of the top and bottom holes 116 and 118 in frame 34 cooperate with the configuration of the combination ratchet and windlass drum 130 which is captured within housing 100 for rotation about an axis perpendicular to plate 36, as described in more detail hereinafter. As best seen in FIGS. 2, 3, 7 and 10, drum 130 comprises a generally cylindrical member having an outside diameter more than double its axial thickness, with a bottom rim 132 having a notch 134 complementary to tooth 124 and a pair of notches 136 and 138 respectively complementary to teeth 120 and 122. These notches are located angularly to match up with teeth 120–124 when drum 130 is centered on hole 118 and positioned angularly as shown in FIG. 10 and the frame 34 is positioned as shown in FIG. 9. Drum 130 has a bifurcated anchoring projection 140 projecting radially outwardly above rim 132 and having a semi-circular configuration matching that of notch 126 and angularly aligned therewith when the notches in rim 132 are aligned with their associated teeth 120–124. The periphery of drum 130 between rim 132 and the upper end surface 142 of drum 130 (FIG. 7) is formed into two circumferentially extending rows of ratchet teeth 144 and 146 separated by a circumferential median chain groove 148 (see also FIG. 3). The upper and lower rows of teeth 146 and 144 are aligned circumferentially with one another and are seen in plan respectively in phantom in FIG. 2 and FIG. 10. Teeth 120 and 122 correspond in shape with the spacing between a pair of adjacent ratchet teeth and each are aligned with such a space. The teeth 144 and 146 extend for about 270 degrees of the circumference of drum 130, terminating at one end at projection 140 and at the other end in an oversized tooth 150 (FIGS. 2 and 10).

The interior of drum 130 preferably is hollow, being defined by a generally cylindrical cavity 152 concentric with rim 132 and open at the bottom of the drum. The upper portion of the drum centrally thereof is defined by a hub portion 154 having a square bore 156 extending from cavity 152 upwardly and opening at the upper surface 158 of hub 154 (FIGS. 7 and 10). Hub 154 is dimensioned to project axially through the opening 116 in top wall 110 of the housing and has a close fit therewith to provide an upper journal for drum 130 in the housing. Hub 130 also is journalled at its lower end by the close clearance fit of rim 132 against the cylindrical periphery of hole 118 when it is resting on teeth 120–124, as best seen in FIG. 7.

To install drum 130 in frame 134, drum 130 is oriented angularly to the position shown in FIG. 10 relative to the position of frame 34 shown in FIG. 9 so that projection 140 is aligned with notch 126, thereby aligning tooth 124 with notch 134 and teeth 120 and 122 with notches 136 and 138 respectively. Drum 130 then may be inserted axially endwise from beneath frame 34 up into hole 118 until hub 154 is inserted through hole 116 and the upper surface 142 of the drum butts against the undersurface of wall 110 (FIG. 7). Drum 130 then is rotated clockwise as viewed in FIGS. 9 and 10 about 90 degrees to deregister teeth 120–124 with their respective notches in the drum, whereupon the undersurface of rim 132 rests upon the upper surface of these teeth to thereby lock the drum axially against endwise movement within the housing 100. Drum 130 will be positioned as illustrated in phantom in FIG. 2, wherein projection 140 generally is aligned with the opening 106 in the front end of the housing 100. In this position, a pin hole 160 (FIGS. 7 and 10) which extends axially through projection 140 is aligned with a somewhat larger access hole 162 in wall 110 (FIGS. 2 and 7). The end link 108' of chain 108 is placed horizontally in the slot of projection 140 so that the center of the link is aligned with hole 160, and then an anchoring pin is inserted through hole 162 and secured with a force fit in the position shown in FIG. 7 to thereby connect chain 108 to drum 130.

In a similar fashion, pawl 114 is installed in housing 100 by inserting the pawl endwise through opening 110 until the axial bore 168 in the center hub 170 of the pawl (FIG. 6) is aligned with a hole 172 in top wall 110 and a coaxial hole 174 in plate 36. Then a journal pin 176 is inserted through holes 172, bore 168 and hole 174 and retained by a force fit in holes 172 and 174 to provide a pivot mounting for pawl 114. Preferably, the pawl is spaced above the upper surface of plate 36 by a washer 178. The ratchet tooth arm 180 of pawl 114 has a spring pilot boss 182 (FIG. 2) to locate the small end turn of a spiral compression spring 184, the large end turn of spring 184 butting against an inwardly angled wall 186 formed in the front end of housing 100 to thereby bias pawl 114 in a counter-clockwise direction as viewed in FIG. 2 and thus yieldably urge the end of finger 180 into ratcheting engagement with the ratchet teeth 144 and 146 of drum 130. Pawl 144 thus permits counter-clockwise rotation of drum 130 and prevents clockwise rotation thereof, unless the pawl is released from ratcheting engagement with the drum by pressing finger 112 to pivot pawl 114 clockwise until the end of finger 180 clears teeth 144 and 146.

Drum 130 is rotated by inserting the square end of a socket wrench 182, as indicated in phantom in FIG. 1, into socket 156, and applying torque to rotate drum 130 counter-clockwise as viewed in FIG. 2 to thereby wind chain 108 onto the drum, the horizontal links of the chain feeding in groove 148 and the vertical links laying against teeth 144, 146. Drum 130 can be rotated approximately 270 degrees or three-quarters of a turn from the position shown in FIG. 2, whereupon projection 140 will come into interfering eingagement with pawl 114, thus limiting further rotation of the drum in this direction. This stop point is just short of the position in which the teeth 120–124 register with their respective notches in drum 130 and hence the drum cannot reregister with these teeth when rotated in the wind-up direction of the drum. Likewise, projection 140 will come into stopping engagement with the end of leg 180 of pawl 114 when the drum is allowed to rotate clockwise from its position in FIG. 2, and hence the drum likewise cannot register with the teeth in the housing in its opposite direction of rotation. The drum thus remains reliably captured within the housing once pawl 114 is installed in the housing.

The front end of the housing side wall adjacent opening 106 has an inwardly curved portion 190 and the top wall 110 of housing 100 has a downwardly curved portion 192 (FIGS. 2 and 3) to define a tapered mouth about opening 106 to assist in feeding chain 108 to and from drum 130.

Due to the vertical orientation of the axis of drum 130 in housing 100, tiedown 32 of the present invention has a low silhouette particularly well adapted to tiedown of automobiles on railway or highway auto haulers even when such vehicles are constructed with very small road clearances. Normally, four tidewowns 32 are provided for each vehicle and arranged two behind and two in front of the vehicle, with a tiedown chain 108 connecting each tiedown 32 with the frame of the vehicle, as indicated with respect to one of the rear tiedowns connected to the rear portion of a passenger vehicle indicated at 196 in FIG. 1. After chain 108 has been connected suitably to the vehicle, tiedown 32 is slid away from the vehicle to hand tension the chain until the chain is paid out fully from the drum, as indicated in FIG. 2. During this positioning motion, dog 62 is swung clockwise from the position shown in FIG. 2 and then lifted to the position shown in phantom in FIG. 4 so that projection 82 can slide along the upper surface 40 of beam 20 as tiedown 32 is moved away from the vehicle. When the tiedown is positioned approximately, dog 62 is allowed to engage the nearest selected hole 28 in beam 20, spring 76 biasing the dog downwardly to force projection 82 into the seelcted hole 28. The keeper 96 thus will be aligned for entry into the cavity 92 of the housing 88.

Wrench 182 then is applied to drum 130 to rotate the same in the wind-up direction, thereby tensioning chain 108 and tending to pull tiedown 32 toward vehicle 196. The restraint of beam 20 against projection 82 during this take-up will pivot dog 62 counterclockwise as viewed in FIG. 2, causing keeper 96 to enter cavity 92 and surface 86 of the dog to butt against stop 88, at which point tiedown 32 is held securely against further movement along beam 20 toward the vehicle. Further wind-up of drum 130 will draw in several inches of chain 108 and thus pull vehicle 196 down on its springs to fasten it securely to the carrier deck. Dog 62 cannot be unlocked under this condition because keeper 96 is held in housing 88 by the force of the vehicle springs acting through chain 108 on the tiedown. Of course, during wind-up of the drum, pawl 114 ratchets over the teeth 144, 146 and, when wind-up torque is released from the drum, it will engage at its end the registered teeth 144, 146 to lock the drum 130 against unwinding rotation.

When it is desired to release tiedown 32 to loosen chain 108 during the unloading procedure, pawl 114 is tripped to release position by pressing release finger 112 to rotate pawl 114 clockwise. When the tension is removed from chain 108, tiedown 32 can be slid away from the vehicle, which movement pivots dog 62 clockwise as viewed in FIG. 2, to withdraw keeper 96 from the housing 88, whereupon dog 62 can be lifted to disengage it from beam hole 28.

Figure 11:
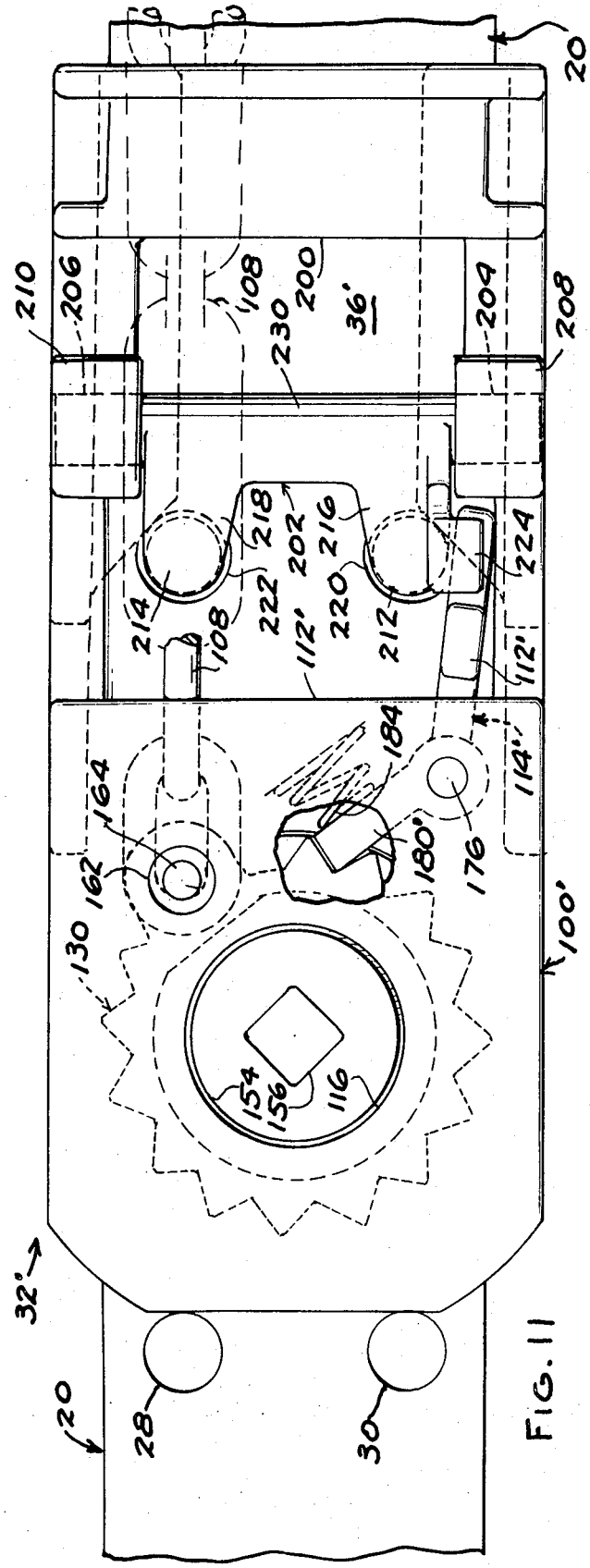
FIG. 11 is a top plan view of a modified form of a low clearance tiedown windlass mechanism also in accordance with the present invention.
Figure 12:
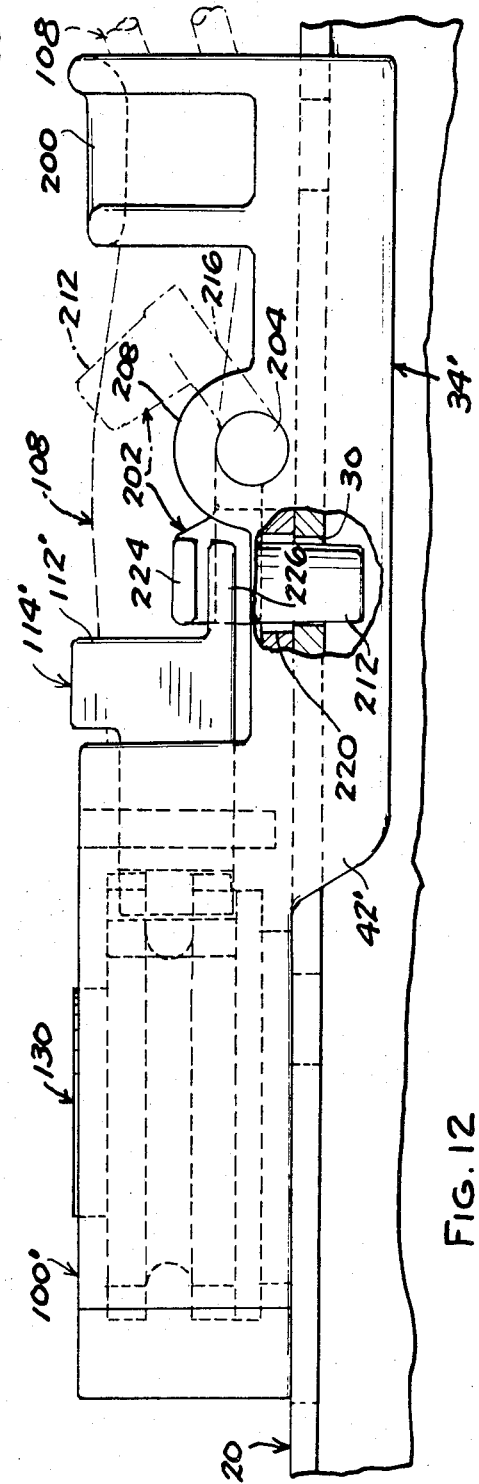
FIG. 12 is a side elevational view of the tiedown shown in FIG. 11.

A modified form of a tiedown mechanism 32' also in accordance with the present invention is shown in FIGS. 11 and 12 wherein like reference numerals are applied to like parts described previously with respect to tiedown 32, and like reference numerals raised by a prime suffix are applied to similar parts corresponding in function to the similarly numbered part in tiedown 32. In tiedown 32', the frame 34' also is cast in one piece and adapted to slidably embrace the cross flange 24 of T-beam 20 to capture the tiedown on the beam and permit only longitudinal sliding movement of the tiedown along the beam. Tiedown 32' differs from the previously described tiedown 32 principally in the construction of the locking dog and chain guide. Also, frame 34' has a housing 100' positioned at one end thereof and the base plate 36' extends forwardly from the front end of the housing by a distance about equal to the length of the housing. A generally U-shaped chain guide 200 is provided at the front end of frame 34' through which a chain 108 passes as it is led into and paid out from drum 130. Between guide 200 and the front end 112' of housing 100 a locking dog is mounted for pivotal movement about a horizontal axis between the solid and dotted line positions shown in FIG. 12. Dog 202 has a pair of trunnions 204 and 206 which are journalled in bosses 208 and 210 provided at the opposite side edges of frame 34'. A pair of locking studs 212 and 214 are carried dependent from spaced arms 216 and 218 of dog 202 which are adapted to swing down through circular holes 220 and 222 respectively in plate 36' into registry with a selected pair of laterally adjacent beam holes 30 and 28 to lock tiedown 32' against movement longitudinally of beam 20. Arm 216 of dog 202 has a laterally outwardly projecting finger 224 adapted to overlie a forwardly projecting finger 226 which extends from the lower portion of finger 112' of pawl 114' when dog 202 is pivoted to the locked position shown in solid lines in FIGS. 11 and 12. Finger 224 is used in prying dog 202 upwardly out of locking engagement with the T-beam and as a finger hold for the pivoting dog.

It is to be noted that chain 108 rides slidably on the upper surfaces of the center shaft 230 and arm 218 of dog 202 in feeding from guide 200 into the chain entrance opening of housing 100'. Thus, when drum 130 is rotated to apply tension to chain 108 after tiedown 32' has been locked in position on the T-beam, the taut condition of the chain will cause it to bear downwardly on arm 218 to maintain dog 202 in locked position to thereby restrain the dog against upward pivotal movement. When it is desired to release tiedown 32', pawl 114' is tripped by forcing finger 112' clockwise as viewed in FIG. 11, thereby allowing the chain to unwind from drum 130. When sufficient slack is available in the chain, dog 202 may be pivoted upwardly to release locking studs 212 from engagement with T-beam 20, thereby enabling tiedown 32' to be respositioned along the beam. Also, it will be noted that the arrangement of the structure of tiedown 32' is such that the vertical dimension of the unit (measured perpendicularly from the upper surface of beam 20) is the same as tiedown 32, thus maintaining the low silhouette feature of the tiedown windlass mechanism of the present invention.

From the foregoing description, it now will be apparent that the low clearance vehicle windlass tiedown of the present invention provides a strong, reliable and easyto-operate device of economical construction which presents a very low vertical silhouette to afford maximum clearance between the carrier mounted hold-down structure and the under-body structure of the vehicle. The mounting of drum 130 for rotation about a vertical axis (i.e., an axis perpendicular to the cross flange 24 of the T-beam 20) together with the axially foreshortened configuration of drum 130 and its mounting in housing 100 or 100', cooperate with the minimum vertical dimension characteristics of the tiedown 32 or 32' of the present invention to accomplish the low silhouette result. Although drum 130 has an effective angle of rotation of only 270 degrees, its diameter is sufficient to permit winding about six inches of chain in a practical working embodiment of the present invention. This in turn is sufficient to pull down vehicle 196 adequately on its springs, thus providing the advantages of a tiedown having a built-in windlass mechanism.

The openings 102 in the side walls of housing 100, the opening 104 in the rear wall of the housing, the openings 106 and 110 in the front wall of the housing, the hollow character of drum 130, and the journalling of drum 130 in a large opening 118 at the bottom of the tiedown cooperate to provide adequate clearance for travel of projection 140 and chain 108 as it is wound on the drum and also provide a well-vented structure so that water will drain out of the unit readily, and so that snow and ice do not tend to clog or jam the unit. The vertical axis mounting of drum 130 also enables access to the top opening socket 156 so that wrench 182 is applied very easily to the unit to tension the tiedown chain. This orients the wrench so that it is pivoted in a horizontal plane when working the tiedown, which is an added advantage when the tiedown is disposed beneath the vehicle. In both embodiments illustrated herein, the locking dogs are biased to a self-loking condition by tensioning of the hold-down chain, an added safety feature of the present invention.

I claim:

1. A low profile windlass tiedown for securing cargo to a cargo carrier having an anchoring beam extending longitudinally adjacent a cargo receiving space of the carrier with an outer surface adapted to face the cargo, a pair of laterally spaced parallel side edges and a plurality of locking recesses in the outer surface arranged in a row running lengthwise of the beam between its side edges, said tiedown comprising a frame adapted to slidably engage the beam side edges to capture said tiedown on the beam for only longitudinal sliding movement therealong, said frame including a plate adapted to be slidably disposed adjacent the beam outer surface and having a through opening adapted to be registered with any selected one of the recesses by movement of said tiedown along the beam, a dog mounted on said frame having a projection insertable through said plate opening for insertion into the selected recess to thereby lock said tiedown against longitudinal movement relative to the beam, flexible means for connecting said tiedown to the cargo and a pawl and ratchet windlass mechanism mounted in said frame including a drum connected to one end of said flexible means and rotatable about an axis perpendicular to said plate for taking up and paying out said flexible means, said frame having a housing disposed on said plate having a top wall plate spaced from said plate with a journal opening therein, said plate having a journal opening therein in coaxial alignment with said wall journal opening, said drum having two spaced hub portions journalled one in each of said journal openings, said plate journal opening and said drum having cooperating tooth and notch means adapted to register with one another in a predetermined angular position of said drum relative to said housing to permit said drum to pass axially through said plate journal opening, and means for maintaining said drum positioned within an angular range wherein said tooth and ratchet means remain out of registry to thereby capture said drum in said housing.

2. The tiedown as set forth in claim 1 wherein said top wall journal opening is smaller in diameter than said plate journal opening and said drum has a hub portion projecting into said top wall journal opening, said drum having an end surface surrounding said hub to limit axial movement of said drum in a direction away from said plate.

3. The tiedown as set forth in claim 2 wherein said drum is hollow and has a non-circular opening in said hub for receiving a wrench or the like for applying torque to said drum.

4. The tiedown as set forth in claim 3 wherein said housing generally is rectangular in configuration and has openings in each of the four sides thereof.

5. A low profile windlass tiedown for securing cargo to a cargo carrier having an anchoring beam extending longitudinally adjacent a cargo receiving space of the carrier with a flat tiedown receiving surface adapted to face the cargo, said beam also having a pair of laterally spaced parallel side surfaces and a plurality of locking recesses in at least one of said surfaces arranged in a row running lengthwise of the beam, said tiedown comprising a frame adapted to slidably engage the beam surfaces to loosely capture said tiedown on the beam for longitudinal sliding movement therealong and to prevent said tiedown from being lifted free of said beam, said frame being adapted to be parallel to and be slidably disposed adjacent said tiedown receiving surface and having a through opening adapted to be registered with any selected one of the recesses by movement of said tiedown along the beam, locking means mounted on said frame having a projection insertable through said frame opening for insertion into the selected recess to thereby lock said tiedown against longitudinal movement relative to the beam, flexible means for connecting said tiedown to the cargo and a pawl and ratchet windlass mechanism mounted on said frame including a drum connected to one end of said flexible means and rotatable about an axis perpendicular to said tiedown receiving surface of the beam for taking up and paying out said flexible means, said frame comprising a housing having a bottom wall and a top wall spaced from and parallel to said bottom wall with a journal opening therein, said bottom wall having a journal opening therein in coaxial alignment with said top wall journal opening, said drum having two spaced hub portions journalled one in each of said journal openings, said drum also having two circumferential rows of ratchet teeth separated by a circumferential groove for receiving said flexible means therein when winding said flexible means on said drum, said pawl mechanism comprising a pawl pivotally mounted in said housing for rotation about an axis extending parallel to said drum axis, a spring biasing said pawl into engagement with said teeth and a release finger projecting through an opening in said housing for pivoting said pawl to release it from ratcheting engagement with said drum.

6. The tiedown as set forth in claim 5 wherein said pawl extends through an opening in a front wall of said housing adjacent one side thereof and said chain extends through another opening in said front wall adjacent the other side thereof.

7. A low profile windlass tiedown for securing cargo to a cargo carrier having an anchoring beam extending longitudinally adjacent a cargo receiving space of the carrier with a flat tiedown receiving surface adapted to face the cargo, said beam also having a pair of laterally spaced parallel side surfaces and a plurality of locking recesses in at least one of said surfaces arranged in a row running lengthwise of the beam, said tie down comprising a frame adapted to slidably engage the beam surfaces to loosely capture said tiedown on the beam for longitudinal sliding movement therealong and to prevent said tiedown from being lifted free of said beam, said frame being adapted to be parallel to and be slidably disposed adjacent said tiedown receiving surface and having a through opening adapted to be registered with any selected one of the recesses by movement of said tiedown along the beam, locking means mounted on said frame having a projection insertable through said frame opening for insertion into the selected recess to thereby lock said tiedown against longitudinal movement relative to the beam, flexible means for connecting said tiedown to the cargo and a pawl and ratchet windlass mechanism mounted on said frame including a drum connected to one end of said flexible means and rotatable about an axis perpendicular to said tiedown receiving surface of the beam for taking up and paying out said flexible means, said frame comprising a housing having a bottom wall and a top wall spaced from and parallel to said bottom wall with a journal opening therein, said bottom wall having a journal opening therein in coaxial alignment with said top wall journal opening, said drum having two spaced hub portions journalled one in each of said journal openings, said locking means comprising a dog mounted for limited universal movement on said frame adjacent and exteriorly of the rear end of said housing, said frame having an abutment spaced from said housing and disposed adjacent the free end of said dog on the side thereof remote from said housing, said dog extending transversely of said beam in the locked position thereof, said dog having a surface disposed against said abutment in the locked position of said dog.

8. A low profile windlass tiedown for securing cargo to a cargo carrier having an anchoring beam extending longitudinally adjacent a cargo receiving space of the carrier with an outer surface adapted to face the cargo, a pair of laterally spaced parallel side edges and a plurality of locking recesses in the outer surface arranged in a row running lengthwise of the beam between its side edges, said tiedown comprising a frame adapted to slidably engage the beam side edges to capture said tiedown on the beam for only longitudinal sliding movement therealong, said frame including a plate adapted to be slidably disposed adjacent the beam outer surface and having a through opening adapted to be registered with any selected one of the recesses by movement of said tiedown along the beam, a dog mounted on said frame having a projection insertable through said plate opening for insertion into the selected recess to thereby lock said tiedown against longitudinal movement relative to the beam, flexible means for connecting said tiedown to the cargo and a pawl and ratchet windlass mechanism mounted in said frame including a drum connected to one of said flexible means and rotatable about an axis perpendicular to said plate for taking up and paying out said flexible means, said frame having a housing disposed on said plate having a top wall spaced from said plate with a journal opening therein, said plate having a journal opening therein in coaxial alignment with said wall journal opening, said drum having two spaced hub portions journalled one in each of said journal openings, said drum having two circumferential rows of ratchet teeth separated by a circumferential groove for receiving said flexible means therein when winding said flexible means on said drum, and said pawl mechanism comprising a pawl pivotally mounted in said housing for rotation about an axis extending parallel to said drum axis, a spring biasing said pawl into engagement with said teeth and a release finger projecting through an opening in said housing for pivoting said pawl to release it from ratcheting engagement with said drum, said pawl extending through an opening in the front wall of said housing adjacent one side thereof and said chain extending through another opening in said front wall adjacent the other side thereof, said housing having an access opening in the top wall thereof in fore and aft alignment with said chain opening and said drum having a bifurcated projection extending radially therefrom with an anchoring pin secured in said projection and extending parallel to the axis of said drum, said drum being rotatable to align said anchoring pin with said access opening in said top wall.

9. A low profile windlass tiedown for securing cargo to a cargo carrier having an anchoring beam extending longitudinally adjacent a cargo receiving space of the carrier with an outer surface adapted to face the cargo, a pair of laterally spaced parallel side edges and a plurality of locking recesses in the outer surface arranged in a row running lengthwise of the beam between its side edges, said tiedown comprising a frame adapted to slidably engage the beam side edges to capture said tiedown on the beam for only longitudinal sliding movement therealong, said frame including a plate adapted to be slidably disposed adjacent the beam outer surface and having a through opening adapted to be registered with any selected one of the recesses by movement of said tiedown along the beam, a dog mounted on said frame having a projection insertable through said plate opening for insertion into the selected recess to thereby lock said tiedown against longitudinal movement relative to the beam, flexible means for connecting said tiedown to the cargo and a pawl and ratchet windlass mechanism mounted in said frame including a drum connected to one end of said flexible means and rotatable about an axis perpendicular to said plate for taking up and paying out said flexible means, said frame having a housing disposed on said plate having a top wall spaced from said plate with a journal opening therein, said plate having a journal opening therein in coaxial alignment with said wall journal opening, said drum having two spaced hub portions journalled one in each of said journal openings, said dog being mounted for limited universal movement on said plate adjacent the rear end of said housing, said plate having an abutment on said plate spaced from said housing and disposed adjacent the free end of said dog on the side thereof remote from said housing, said dog extending transversely of said plate and said beam in the locked position thereof, said dog having a surface disposed against said abutment in the locked position of said dog, said abutment having a cavity therein facing said dog and said dog having a keeper projection extending into said cavity in the locked position of said dog to thereby restrain upward pivotal movement of said dog.

10. A low profile windlass tiedown for securing cargo to a cargo carrier having an anchoring beam extending longitudinally adjacent a cargo receiving space of the carrier with an outer surface adapted to face the cargo, a pair of laterally spaced parallel side edges and a plurality of locking recesses in the outer surface arranged in a row running lengthwise of the beam between its side edges, said tiedown comprising a frame adapted to slidably engage the beam side edges to capture said tiedown on the beam for only longitudinal sliding movement therealong, said frame including a plate adapted to be slidably disposed adjacent the beam outer surface and having a through opening adapted to be registered with any selected one of the recesses by movement of said tiedown along the beam, a dog mounted on said frame having a projection insertable through said plate opening for insertion into the selected recess to thereby lock said tiedown against longitudinal movement relative to the beam, flexible means for connecting said tiedown to the cargo and a pawl and ratchet windlass mechanism mounted in said frame including a drum connected to one end of said flexible means and rotatable about an axis perpendicular to said plate for taking up and paying out said flexible means, said frame having a housing disposed on said plate having a top wall spaced from said plate with a journal opening therein, said plate having a journal opening therein in coaxial alignment with said wall journal opening, said drum having two spaced hub portions journalled one in each of said journal openings, said housing being mounted on one end of said plate and the other end of said plate has a generally U-shaped guide mounted therein through which said flexible means passes on its way to said drum to thereby position said chain adjacent the upper surface of said plate, said dog comprising a shaft journalled in said frame for pivotal movement about an axis perpendicular to said drum axis, said dog having at least one arm projecting radially therefrom, said projection being carried on the free end of said arm, said arm being disposed beneath the path of travel of said flexible means running from said housing through said guide.

11. A low profile windlass tiedown for securing cargo to a cargo carrier having an anchoring beam extending longitudinally adjacent a cargo receiving space of the carrier with a flat tiedown receiving surface adapted to face the cargo, said beam also having a pair of laterally spaced parallel side surfaces and a plurality of locking recesses in at least one of said surfaces arranged in a row running lengthwise of the beam, said tiedown comprising a frame adapted to slidably engage the beam surfaces to loosely capture said tiedown on the beam for longitudinal sliding movement therealong and to prevent said tiedown from being lifted free of said beam, said frame being adapted to be parallel to and be slidably disposed adjacent said tiedown receiving surface and having a through opening adapted to be registered with any selected one of the recesses by movement of said tiedown along the beam, locking means mounted on said frame having a projection insertable through said frame opening for insertion into the selected recess to thereby lock said tiedown against longitudinal movement relative to the beam, flexible means for connecting said tiedown to the cargo and a pawl and ratchet windlass mechanism mounted on said frame including a drum connected to one end of said flexible means and rotatable about an axis perpendicular to said tiedown receiving surface of the beam for taking up and paying out said flexible means, said frame comprising a housing having a bottom wall and a top wall spaced from and parallel to said bottom wall with a journal opening therein, said bottom wall having a journal opening therein in coaxial alignment with said top wall journal opening, said drum having two spaced hub portions journalled one in each of said journal openings, at least one of said journal openings and said drum having cooperating tooth and notch means adapted to register with one another in a predetermined angular position of said drum relative to said housing to permit said drum to pass axially through said one journal opening when installing said drum in said housing, and means for maintaining said drum positioned within an angular range wherein said tooth and notch means remain out of registry and wherein said tooth is disposed axially between said notch means and the other journal opening to thereby capture said drum in said housing by preventing axial movement of said drum in the direction of removal thereof, the direction of removal being opposite to the direction in which said drum is moved when installing said drum in said housing.

12. The tiedown as set forth in claim 11 wherein said other journal opening is smaller in diameter than said one journal opening and said drum has a hub portion projecting into said other journal opening, said drum having an end surface surrounding said hub to limit further axial movement of said drum in the direction of installation thereof once said drum has reached its installed position in said housing.

13. The tiedown as set forth in claim 12 wherein said drum is hollow and has a noncircular opening in said hub for receiving a wrench or the like for applying torque to said drum.

14. The tiedown as set forth in claim 13 wherein said housing generally is rectangular in configuration and has openings in each of the four sides thereof.

15. A carriage for use in a vehicle tiedown structure, which structure includes a longitudinally extending anchoring member adapted to be anchored lengthwise upon a longitudinally extending deck of a transport and having upright side walls, a plurality of longitudinally spaced openings and a pair of laterally spaced and longitudinally extending flanges, said carriage being adapted to be carried by and movable lengthwise of said member, said carriage comprising an elongated body having side portions adapted to extend under said flanges of said member to prevent said carriage from lifting off of said member, said body having a bottom wall, a low, substantially flat horizontal top plate spaced above said bottom wall, said body having upstanding portions extending upwardly from said bottom wall, said top plate being mounted on said upstanding portions, said bottom wall, top plate and upstanding portions defining a space therebetween wherein the sides of said carriage are open between said upstanding portions, a generally upright shaft in said space mounted for rotation on said bottom wall and top plate, said body having an aperture through one end thereof, a flexible element wound on said shaft in said space and adapted to extend through said aperture to engage and hold a vehicle, a ratchet gear fixed upon said shaft for rotation therewith in a horizontal plane, a ratchet pawl pivotally mounted on said top plate for turning movement in the same horizontal plane as said ratchet gear and engageable with the teeth of said ratchet gear to prevent rotation thereof in one direction, and a transverse lock pin mounted on said body for movement between an extended position adapted to project through a selected opening in said member to lock said carriage to said member in longitudinally adjusted position and a retracted position so as to be withdrawn from the latter opening, said bottom wall and said top plate having openings for journalling said shaft therein, at least one of said journal openings and said shaft having cooperating tooth and notch means adapted to register with one another in a predetermined angular position of said shaft relative to said body to permit said shaft to pass axially through said one journal opening when installing said shaft in said body, and means for maintaining said shaft positioned within an angular range wherein said tooth and notch means remain out of registry and wherein said tooth is disposed axially between said notch means and the other journal opening to thereby capture said shaft in said body by preventing axial movement of said shaft in the direction of removal thereof, the direction of removal being opposite to the direction in which said shaft is moved when installing said shaft in said body.

16. The carriage defined in claim 15, wherein two of said upstanding portions are provided in laterally spaced relation adjacent one end of said body upon which one end portion of said top plate is mounted and connected by a bridge, said laterally spaced upstanding portions and bridge defining said aperture through which said flexible element is adapted to extend from said shaft.

17. The carriage defined in claim 15, wherein spring means are provided for urging said lock pin to its extended position, and a handle extending from said lock pin for manually retracting the same.

References Cited

UNITED STATES PATENTS

| 3,187,686 | 6/1965 | De Podesta | 105—368 T |
| 2,879,722 | 3/1959 | Dunlap | 105—369 B |
| 3,564,577 | 2/1971 | Blunden et al. | 105—369 A |
| 3,507,471 | 4/1970 | Haynes, Jr. et al. | 105—369 A |

DRAYTON E. HOFFMAN, Primary Examiner

U.S. Cl. X.R.

105—369 A; 248—361 A